United States Patent [19]

Koblanski

[11] Patent Number: 5,396,142
[45] Date of Patent: Mar. 7, 1995

[54] POSITIONING APPARATUS

[75] Inventor: John Koblanski, Burnaby, Canada

[73] Assignee: Evan Koblanski, West Vancouver, Canada

[21] Appl. No.: 185,299

[22] Filed: Jan. 24, 1994

[51] Int. Cl.⁶ .............................................. H02N 2/00
[52] U.S. Cl. .................... 310/328; 358/496; 359/213; 369/44.18
[58] Field of Search ........................ 310/328; 358/496; 359/213; 369/44.18

[56] References Cited

U.S. PATENT DOCUMENTS

| | | | |
|---|---|---|---|
| 3,389,274 | 6/1968 | Robertson | 310/328 |
| 3,706,874 | 12/1972 | Lockard | 235/61.11 E |
| 4,453,103 | 6/1984 | Vishnevsky et al. | 310/328 |
| 4,613,782 | 9/1986 | Mori et al. | 310/328 |
| 4,672,256 | 6/1987 | Okuno et al. | 310/328 |
| 4,757,223 | 7/1988 | Ueyama | 310/328 |
| 4,809,086 | 2/1989 | Horiya | 358/293 |
| 5,107,365 | 4/1992 | Ota | 359/213 |

FOREIGN PATENT DOCUMENTS

| | | | |
|---|---|---|---|
| 0142979 | 6/1986 | Japan | 310/328 |
| 0595813 | 3/1978 | U.S.S.R. | 310/328 |
| 0771775 | 10/1980 | U.S.S.R. | 310/328 |

Primary Examiner—Thomas M. Dougherty
Attorney, Agent, or Firm—Townsend and Townsend Khourie and Crew

[57] ABSTRACT

An actuator able to move along a track. The actuator has an elastic coupling member that surrounds the track. The coupling member has a regularly grooved internal surface. There are pairs of piezo electric transducers surround the coupling member. These transducers are polarized with each member of a pair being polarized in a direction different from the other member of the pair. There is an insulator between neighbouring pairs of transducers and absorber means at each end of the actuator. Voltage can be applied to the transducers whereby the application of voltage expands and contracts the transducers, generating waves in the coupling member causing it to move along the track.

35 Claims, 5 Drawing Sheets

POSITIONING APPARATUS

FIELD OF THE INVENTION

This invention relates to an actuator able to move along a track, and to a card scanner that uses the actuator.

DESCRIPTION OF THE PRIOR ART

The introduction of high resolution, reflective laser recording material has made possible the development of optical data cards. These cards, which are about the size of a credit card, are able to store several megabits of information. This type of high density storage card is disclosed, for example, in U.S. Pat. Nos. 4,360,728 and 4,500,777 issued to Drexler. A disadvantage is that in order to read the optical data stored in the optical data card, bulky and complex optical data readers are required. These readers are similar to automatic teller machines currently used by bank customers and the like to have access to their accounts.

Optical data cards have information in digital format recorded in micro-sized holes on a layer of optical material mounted on the card, which is typically of plastic. Because the holes, each representing a data bit, are small, ranging from 1 to 40 microns, a large number of holes or bits can be recorded on one card. Depending on format, densities of 20 million or more bits of data can be achieved.

A substantial amount of space has been required in order to position the optics, source and detectors close to the medium being read. If a rectangular optical data card is used, a series of motor drives are required to move the card below the optics.

Because lenses are used to couple light from the source to the card and back to a sensor, any motion or vibration is detrimental to the operation of the reader. Accordingly these optical lenses have to be securely mounted as close to the card as possible.

Tracking has been a problem with readers of prior art cards. Tracking difficulty limits the reading of high density information and, so far, has been yet another factor in preventing the development of a practical, portable optical card reader/writer.

Accordingly there is clearly a need for a relatively inexpensive positioning device for a hand-held, laser operated card reader/writer capable of precise, controlled movement. The high precision of movement also makes such the apparatus of the present invention useful in micropositioning of optical stages of microscopes, in various microtool positioning for microsurgery and positioning of actuators for computer controlled machining.

SUMMARY OF THE INVENTION

The present invention is directed to this need and, accordingly, the present invention is an actuator able to move along a track and comprising, an elastic coupling member to surround the track, said coupling member having a regularly grooved internal surface; a plurality of pairs of piezo electric transducers surrounding said coupling member, said transducers being polarized with each member of a pair being polarized in a direction different from the other member of the pair; an insulator between neighbouring pairs of transducers; absorber means at each end of the actuator; means to apply voltage to said transducers whereby the application of voltage expands and contracts said transducers, which transmit pressure to said core to cause it to move along said track.

In a further aspect, the invention is a scanner having a table to receive the card, a reading head to view the card and means to move the card relative to the reading head that includes an actuator as defined above.

In yet a further aspect, the invention is a card scanner comprising, a base member; longitudinal track members mounted on said base member; means to hold the card on said base member; an actuator mounted on said track member and able to move along the track member, said actuator comprising an elastic coupling member to surround the track, said coupling member having a regularly grooved internal surface; a plurality of pairs of piezo electric transducers surrounding said coupling member, said transducers being polarized with each member of a pair being polarized in a direction different from the other member of the pair; an insulator between neighbouring pairs of transducers; absorber means at each end of the actuator; means to apply voltage to said transducers whereby the application of voltage expands and contracts said transducers, which transmit pressure to said core to cause it to move along said track; a scanning head moved by operation of said actuators to scan a card.

DESCRIPTION OF THE PREFERRED EMBODIMENTS

Figure 1:
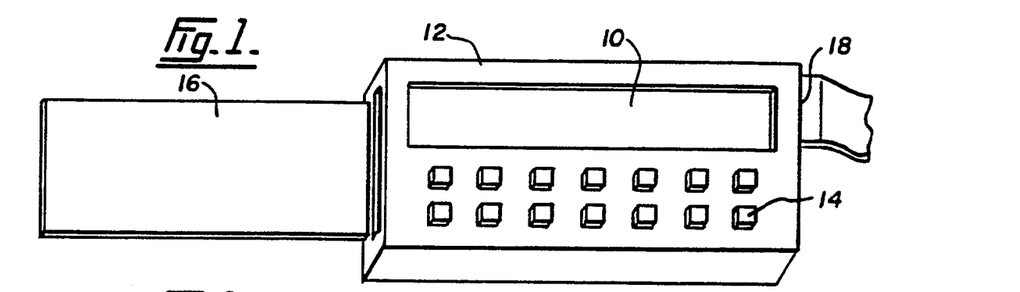
FIG. 1 is an overall view of a card scanner according to the present invention.

FIG. 1 is an external view of the scanner of the invention and comprises a display screen 10 in a case 12 with the various operating keys 14. An optic card 16 is shown being inserted into the apparatus, at the left. The various connections are made at a port 18 to the right of the equipment.

Figure 1A:
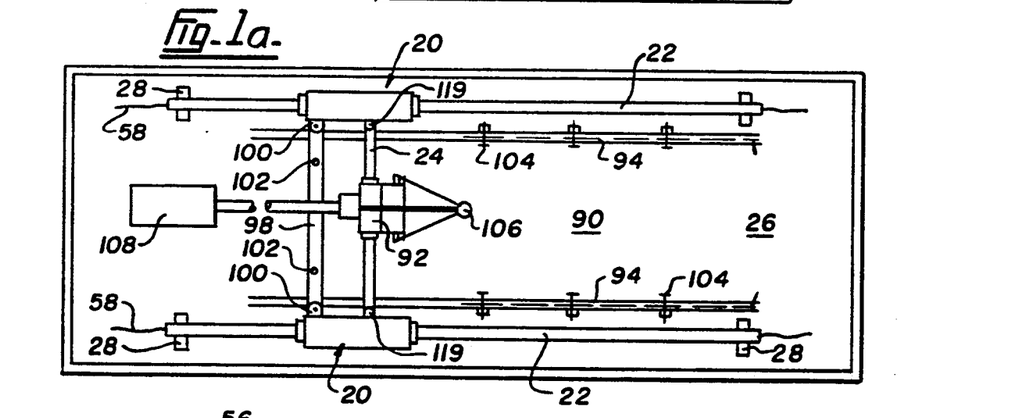
FIG. 1a is a plan view of the equipment of FIG. 1.

FIG. 1a shows the card scanning equipment housed within the case 12 of FIG. 1. The apparatus includes actuators 20 that is able to move along tracks 22. In FIG. 1a two track members 22 are shown extending longitudinally of the equipment. There is also a transverse or second track member 24. The track members 22 are anchored to a chassis 26 and 28.

Figure 2:
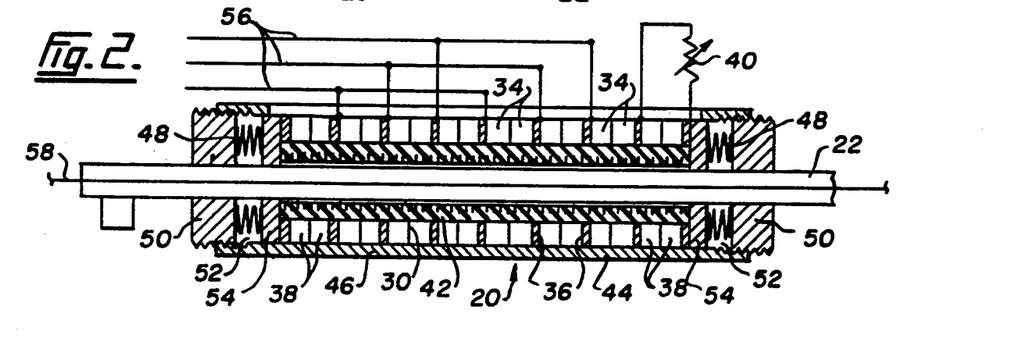
FIG. 2 is a detailed section of an actuator according to the present invention.
Figure 3:
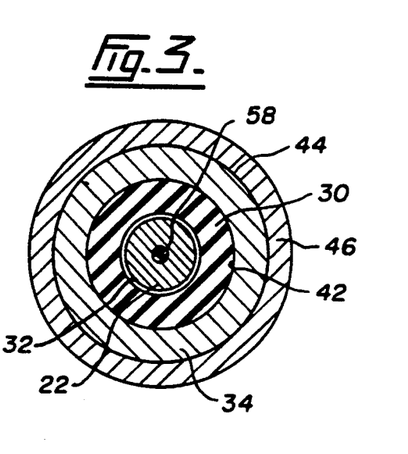
FIG. 3 is a section along the actuator.
Figure 3A:
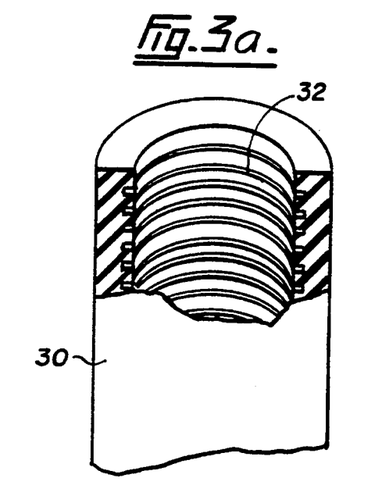
FIG. 3a is a detail of a coupling member of an actuator.

As shown more particularly in FIG. 2, each actuator 20 comprises an elastic coupling member 30 that surrounds the track 22. The coupling member 30 is formed with a regularly grooved internal surface 32 as shown particularly in FIG. 3a. There is a plurality of pairs of piezo electric transducers 34 surround the coupling member 30. These transducers 34 are polarized. Each member of a pair is polarized in a direction different from the other member of the pair. All transducers 34 are polarized radially.

Figure 2A:
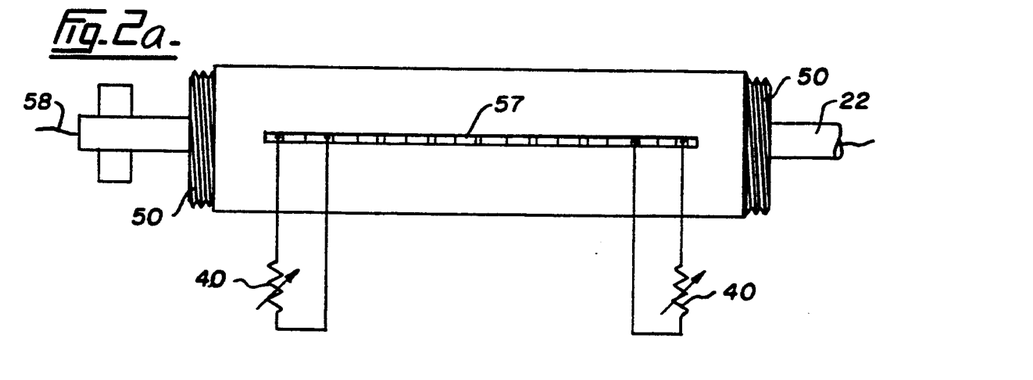
FIG. 2a is an external view of the actuator of FIG. 2.

There is an insulator 36 between neighbouring pairs of transducers 34. There are absorber means at the end of the actuator 20. These are rings 38 mounted on the end of each actuator 20 able to absorb waves generated in the elastic coupling member 30. The rings 38 are also ceramic piezo electric members, radially polarized but include means to dissipate current. In the illustrated embodiment, the means to dissipate the energy comprises a resistance 40 joined across the piezo electric members 38 whereby the electric current generated can be dissipated in heat. In FIG. 2 only one resistance 40 is shown but FIG. 2a shows that the apparatus includes two resistances, one at each end.

There are means to apply a three phase voltage to the transducers. The application and effect of the voltage are described subsequently.

The track 22 is covered with synthetic rubber, desirably chloroprene and, particularly, chloroprene having a hardness of about 99 J.S.I.

In a particularly preferred embodiment, the electric transducers 34 are ceramic annuli having an inner 42 and outer 44 diameter. The inner and outer 42 and 44 diameter are preferably plated with silver. As shown in FIG. 2a, each actuator 20 has an outer 46 casing and there are compression springs 48 at each end of the casing 46 tending to compress the transducers 34. There are stops, in the form of annular members 50, externally threaded, that engage in internally threaded ends 52 to the casing 46. Absorption of energy generated by the passage of a voltage is also supplemented by the use of annuli 54 mounted on the end of each actuator and made of energy absorbing materials. They are mounted on the outside of the piezo electric rings 38 and provide additional absorption of wave energy. Typically, the energy absorbing material will be babbitt metal containing tungsten particles. Annuli 54 are, as shown in FIG. 2, of a smaller internal diameter than the rings 34 and 38 but are of the same external diameter. The internal diameter rests on the track 22.

The actuator illustrated in FIGS. 2, 2a 3 and 3a is an important feature of the present invention and operates as follows.

The transducers 34 are given an cyclical electrical voltage through conductors 56. They are electrically driven cyclically. They are separated in space but arranged to be at the same point in the cycle at different instances of time to produce a phase difference. As a result a travelling wave forms. This is generated by the passage of the voltage into the ceramic transducers 54 which are polarized in the radial direction. This energy is transmitted via the elastic coupler 30. The use of grooves 32 in the elastic member generates Lamb waves which react against the frictional coating resulting in the motion of actuators 20 together with all contained components, along the tracks 22 in a chosen direction, depending upon the phase relations of the voltage. The application of the voltage is described subsequently, notably in the description of FIG. 4.

If the waves were allowed to be reflected at each end, then no motion would result. The actuator 20 would form a standing wave, with no directional preference. The present invention avoids this by the provision of the rings 38 at each end. These absorbers 38 absorb the mechanical energy of the wave forms and convert it to electrical energy, that is the reverse of the transducers 34. The electrical energy is then dissipated in variable resistances 40 as heat energy. By varying this resistance the degree to which the travelling wave is reflected may be controlled, thus providing another method of controlling the motion of the actuator. Any additional energy still present after the transducers 34 can be absorbed in the energy absorbing annuli 54.

It will be noted that the casing 46 has a slot 57 to enable electrical connections, including the connection of resistances 40, which can be made through the casing 46 to the interior of the actuator 20.

The track 22 has an internal resistance wire 58. This can be heated to expand the track 22 to ensure the appropriate compressive contact between the chloroprene coating and the coupler mender 20. The current applied to the wire and thus the heat developed, can be increased as the coating wears, thus maintaining uniform contact.

Figure 4:
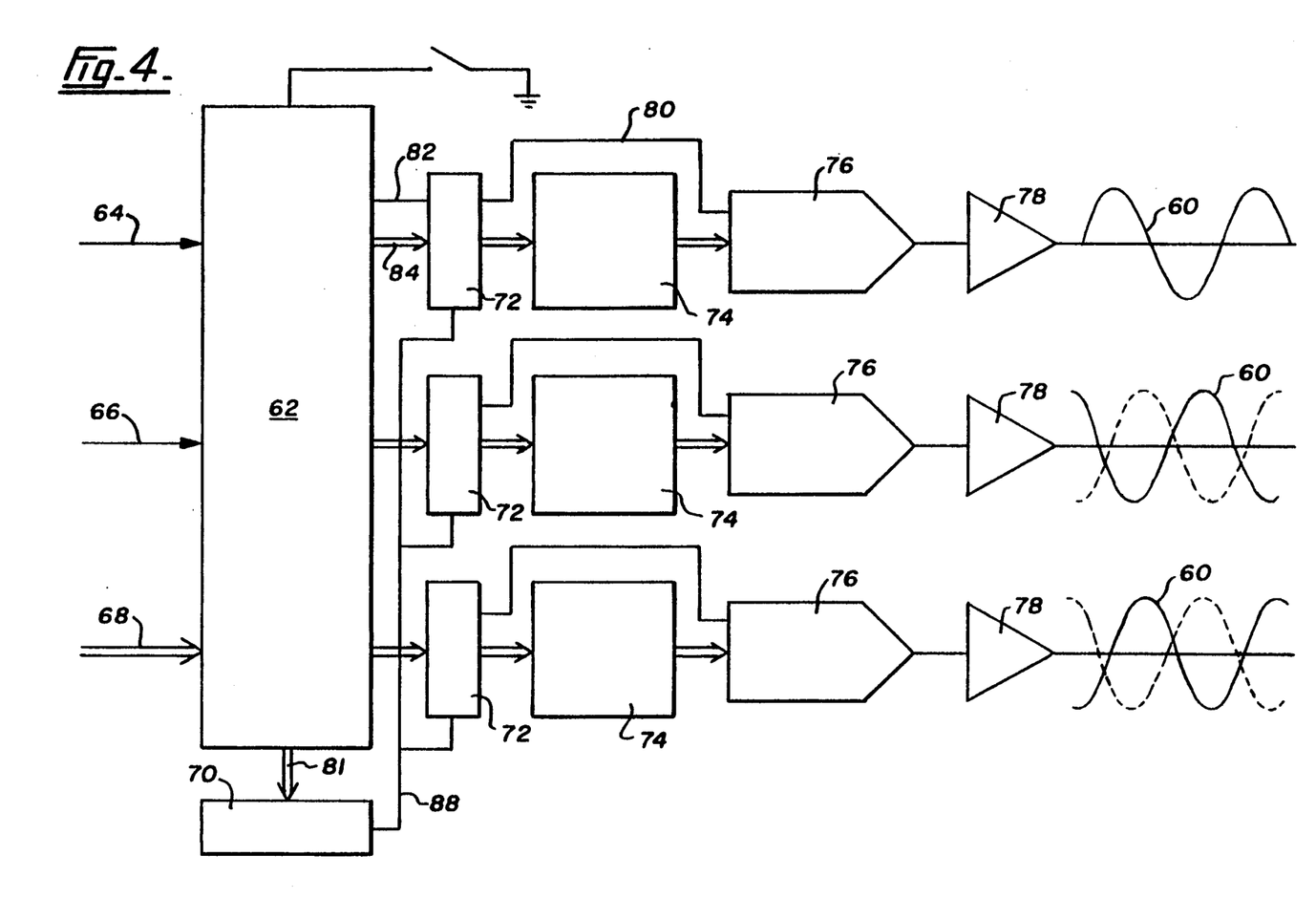
FIG. 4 is a circuit diagram showing a circuit appropriate for the development of 3 time—synchronized wave forms.

FIG. 4 shows a circuit to develop three time-synchronized wave forms 60 of high frequency. Wave forms 60 are produced by a controller 62 in response to command signals 64 (use), 66 (direction) and 68 (distance/speed) input through clock 70. The clock 70 feeds through counters 72. Each counter 72 feeds to a wave form memory 74, to a digital-to-analog converter (DAC) 76 and an amplifier 78. The wave form memory 74 contains a digitized version of the desired wave form 60. As an example, assume the wave form memory 74 contains 360 digitized samples, which represents a single cycle of wave form 60. Wave form memory 74 would typically be a read only memory (ROM) but could be read-write-memory (RAM) to allow more flexibility of wave form creation. Each counter 72 presents an address to the wave form memory 74 which outputs the corresponding digitized sample to a DAC 76 which is latched by a signal 80. The DAC output is amplified by amplifiers 78 to produce a wave form value 60. To produce a complete wave form 60, controller 62 initialize counter 72 to 0, via control lines 82 and data lines 84. Then controller 62 commands counters 72 to continuously count to 359, reset to zero, count to 359, reset to zero and so on. The clock 70 is set to count at the desired rate via control line 81. The clock output 88 causes the counters 72 to count, outputting their counter values to wave form memory 74 as an address. The resulting stream of digitized samples from wave form memory 74, presented to DAC 76 and amplified by the amplifiers 78 produces a continuous wave form 60 whose frequency is determined by the controller 62 and the clock 70. To produce three time-synchronized or phase synchronized wave forms, controller 62 initializes a first counter 72 to 0, a second phase counter 72 to 120 and a third phase counter 72 to 240. Controller 62 commands all the counters 72 to begin counting at the same time via control signals 82. The resulting wave forms 60 are identical in frequency but 120° out of phase with each other.

The controller 62 can dynamically alter the speed in response to command signals 64, 66, 68 by causing the counter 72 to skip counts or advance extra counts via command signals 82. For example, if the second of phase counters 72 is commanded to advance one extra count and the third of phase counters 72 is commanded to advance two extra counts then the resulting wave form 60 would be identical in frequency but two degrees out of phase with each other. By similarly causing the first of phase counters 72 to skip 6 counts and the second of phase counters 72 to skip 12 counts, the resulting wave form would be out of phase 115° with each other (120+1−6).

To produce motion in the opposite direction, the controller 62 initializes the first phase counter 72 to 0, the second phase counter 72 to 240 and the third phase counter 72 to 120. The controller 62 commands all counters 72 to begin counting at the same time via control signals 82. The resulting wave form 60 is identical in frequency, 120° out of phase with each other, but produces motion in the opposite direction from the circumstances as described above.

Figure 7:
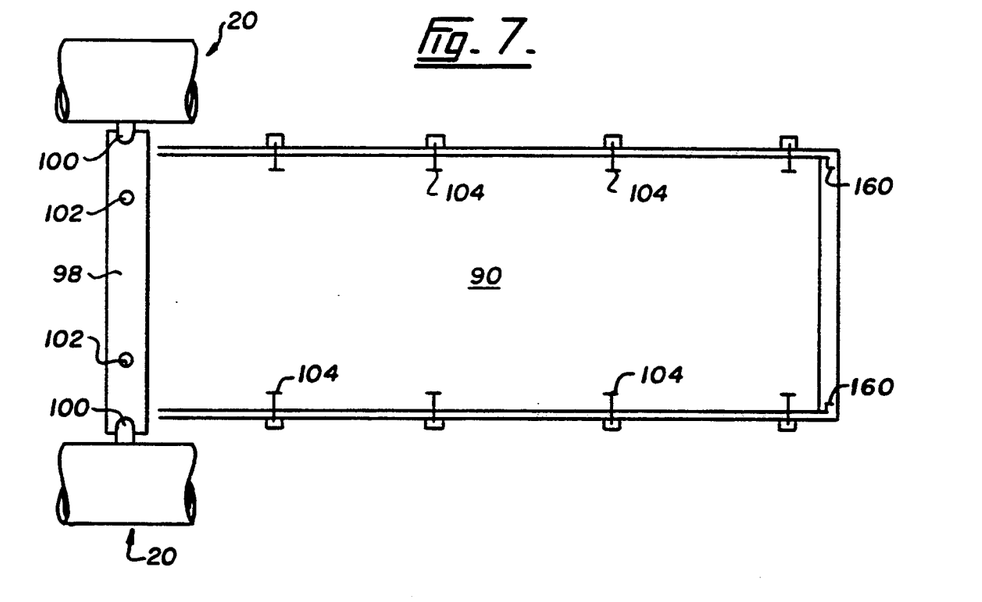
FIG. 7 is a further detail of the apparatus of FIG. 1.
Figure 7A:
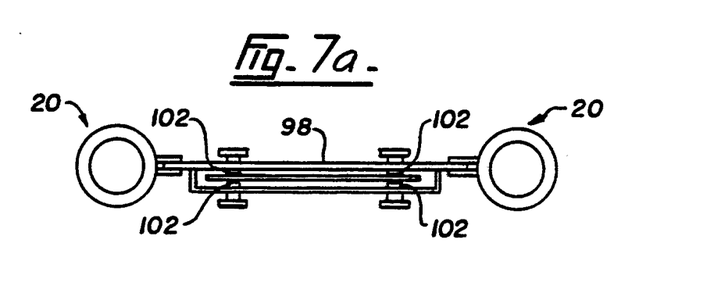
FIG. 7a is an end view of the apparatus of FIG. 7.

As shown particularly in FIG. 1a, the scanner of the present invention comprises a chassis 26 having a table 90 to receive the card 16. There is a reading head (not shown) to view the card 16 and means to move the card 16 relative to the reading head. This means includes an actuator as claimed in claim 1. FIG. 1a shows there are two actuators 20 moving longitudinally of the chassis 26. There is a third actuator 92 moving transversely of the chassis 26 on track 24. Actuators 20 are able to move along the track members 22. The scanning head is moved by operation of the actuators 20 to scan a card 16. Area 90 on the chassis 26 receives the card during scanning. Area 90 is defined by low friction guides 94. The card 16 is held on the chassis 26, a cross-member 98 extending between the actuators 20 and attached by hinges 100 to the actuators 20. There are clamps on the cross member 98 to engage the card 16. The clamps are solenoids 102 operable to clamp the card 16 by the passage of an electric current. The arrangement is shown in FIG. 7a. There are springs 104, typically circular leaf springs, to hold the card down on the scanning area 90.

Figure 5:
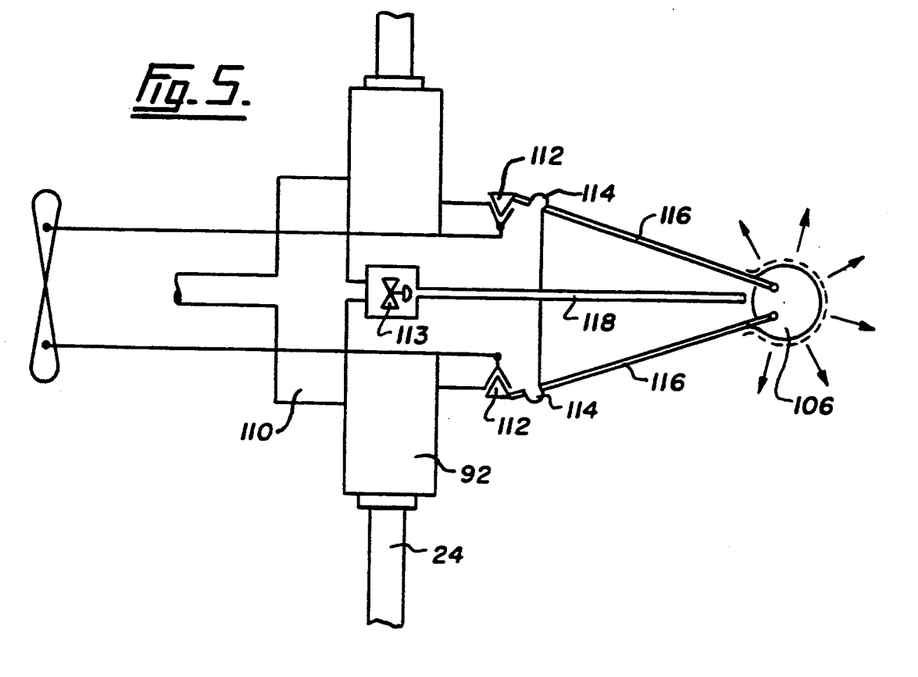
FIG. 5 is a detail of the apparatus of FIG. 1 on an enlarged scale.

There is an air-lift 106 to fly the scanning head. The air-lift 106 is shown particularly in FIG. 1a and, on a larger scale, in FIG. 5. There is a pump 108 to pump air to the lift 106 and a valve 113 to control the flow between the pump 108 and the air lift 106. There is a bladder 110 in the system to regulate the pressure. The pump is pivotally mounted at 112 and there are upper stops limits 114 to restrict upward movement of the air-lift 106 by contacting arms 116 that carry the lift 106. The electrical supply to the scanning head is along the arms 116. A pipe 118 from the valve 113 extends to a point short of the lift 106. The scanning head is mounted beneath air lift 106. The attachment of shaft 24 to actuator 20 is by hinged joints 119.

The apparatus of the present invention has excellent ability to follow the information on an optical card 16. It can be used to perform read/write information on an optical card 16. If the information on the card is written in a series of tracks in a transverse direction across the card, then the tracks are evenly spaced longitudinally on the card. By placing the optical read/write head on a transverse axis 24, as shown in FIG. 1, the head moves transversely across the card 16 under the influence of actuator 92, following a track and hence reading the data. This transverse axis mechanism is mounted to the actuators 20 at 119 allowing the transverse axis, and thus the head, to be moved to another track. Because the data is recorded in small dots, the optical tracks are not perfectly aligned with the transverse axis due to the mechanical tolerances, thermal expansion and the like. Therefore, as the optical head is moved along the transverse axis, tracking information from the optical head is used to move one or both longitudinal axes 22 so as to keep the transverse axis and the optical head centered on the track.

This motion is accomplished as follows. First the optical head motion is initiated along the transverse axis 24. Secondly, as tracking information indicates, one or both longitudinal axes 22 is moved a small distance so as to keep the optical head on track. This motion is coordinated by having a track following controller issue motion commands to each of the individual actuators as well as the transverse axis controller.

The air-lift 106 controls the vertical height of the read/write head. The laser and photocell that make up the read/write head are mounted centrally under the air-lift 106. The laser beam is angled to reflect its light from the data card and onto the photocell. Only one optimum height will produce the maximum amount of light for the photocell. This maximum light is used as an indicator of optimum height. A controller is used to adjust the air valves at the bladder 110 to produce the optimum height for the head to fly. The air supply tube 118 does not contact the head and is not supported by it. Therefore it does not impede the motion of the air fly head. For the same reason a two wire supply 116 is used and supplies current from the pivot points 112. Thus once the optimal flying head height has been set, the air cushion will follow the surface without much input from the controller because of external influences. In order that the power may be supplied to both the photocell and laser through the pivots 112 of the recording head and control the laser diode and information received by the photocell the circuit illustrated in FIG. 6 is used.

Figure 6:
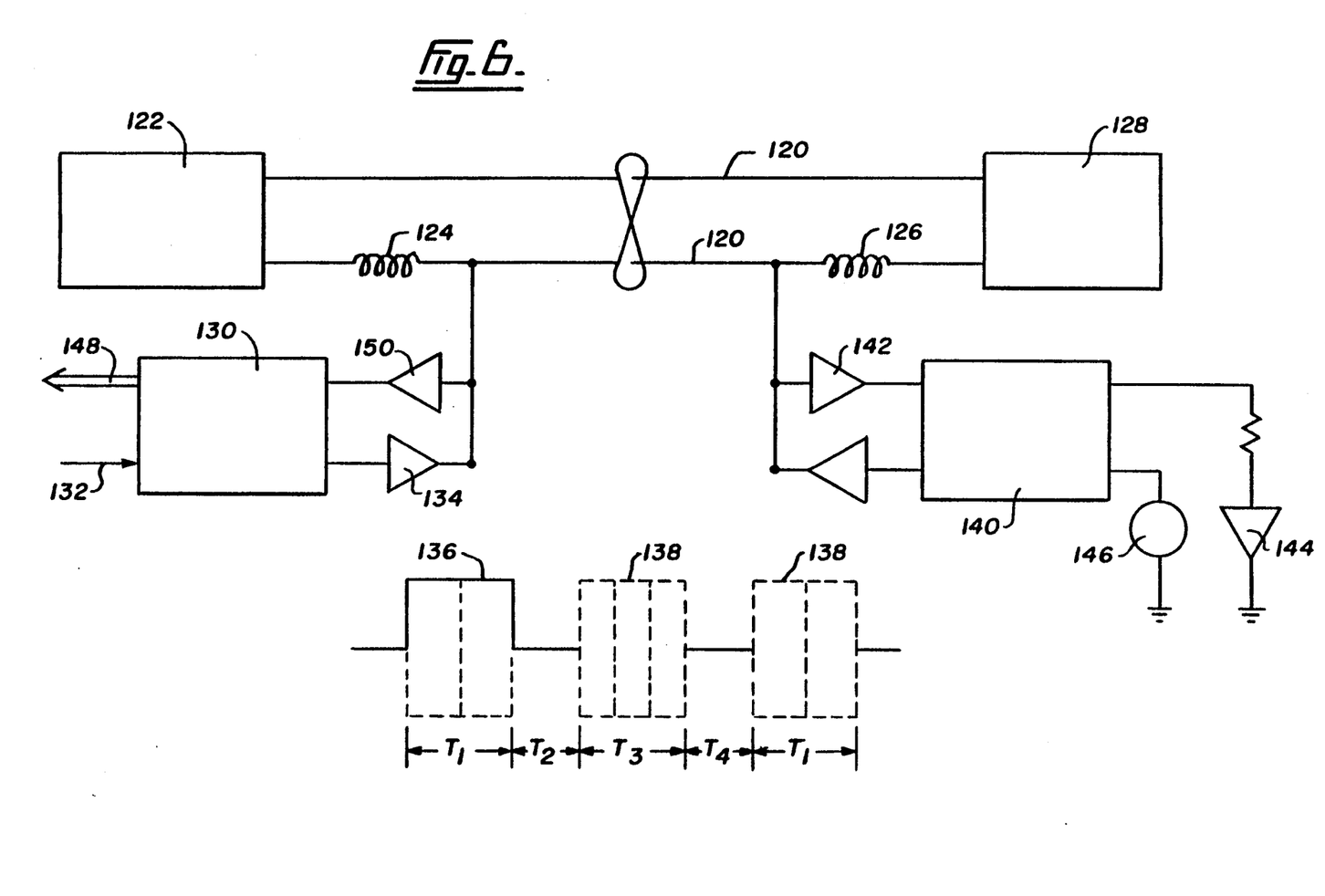
FIG. 6 is a circuit diagram of a two-wire communication and power supply system.

The circuit of FIG. 6 operates over a pair of wires 120. There is a master end of the circuit (to the left) that provides operating power to a slave end of the circuit (to the right) by power supply 122 and high frequency blocking choke 124. The slave end receives operating power by means of high frequency blocking choke 126 and a regulator 128 to provide power for the slave operation. Information is communicated over the wires 120 in both directions by having the master transmit control information during one portion of time ($T_1$) and the slave transmit photocell information during a different portion of time ($T_3$). Idle periods ($T_2$ and $T_4$) ensure that both master and slave do not transmit at the same time. The time sequence $T_1$, $T_2$, $T_3$ and $T_4$ repeats continuously at a rate fast enough to adequately control laser diode output and sense photocell input.

To achieve an orderly transfer of information a master controller 130 will initially transmit laser diode control command 132 via driver 134 for time $T_1$. During time $T_1$ driver 134 will produce either a positive pulse 136 (turn laser diode on) or a negative pulse 138 (turn laser diode off) on wires 120. A slave controller 140 will initially be idle and receive laser diode control pulse 136 via receiver 142.. Slave controller 140 will perform two actions when laser diode control pulse 136 is received. First it will either turn a diode 144 on if a positive control pulse 136 was received or turn the laser diode off if a negative control pulse 138 is received. Secondly, it will measure the time $T_1$, $T_3$ and $T_4$ and remain idle times $T_1$ and $T_2$, transmit photocell 146 status to the master during time $T_1$ with a positive pulse 136 if photocell is on or a negative pulse 138 if photocell 146 is off. During time $T_3$ the slave controller 140 will disable receiver 142 to prevent receiving its own photocell transmission.

After the master controller 130 sends a laser diode control pulse 136 during time $T_1$ it will perform the following actions. First, it will measure $T_2$, $T_3$ and $T_4$. It will receive photocell sense pulse 138 during time $T_3$ and set a photocell output signal 148 to active if a positive pulse 136 is receive or inactive if a negative pulse 138 is received. Secondly, at the end of time $T_4$ it will repeat the above sequence by sending laser diode pulse 136 during time $T_1$. During time $T_1$ the master controller 130 will disable a receiver 150 to prevent receiving its own laser diode transmission. High frequency chokes 124 and 126 prevent pulses 136 and 138 affecting DC power supplies 122 and 128.

Thus in using the equipment of the invention, an optical card 16 is inserted in case 12, that is auto chassis 26, activating a power on switch (not shown). The solenoids 102 are activated to clamp the card 16 at the edges. The actuators 20 pull the card along the (PTFE) track 94 part-way, to the maximum movement of which the actuators 20 are capable. The solenoids 102 are deactivated while the actuators 20 moves the solenoids 102 back a second time to grip the card 16 at its middle. The actuators 20 now move the card 16 as it passes under the springs 104 which maintain the card 16 firmly against the track 94. The track members 94 are of polytetrafluoroethylene to reduce friction. This continues until limit switches 160 at the end of the track 94 are triggered, which notifies the controller to deactivate the solenoids 102 and to move the actuators 20 to their initial position. The process for the optimum height for the read/write head is initiated as described above. Upon instructions from the controller of the head performs the desired functions, reading or writing and tracking as described previously. Precise positioning is attained by having controller 62 issue the required numbers of pulses to all the counters 72. Each pulse advances the actuator approximately 1 micrometer. At frequencies of 1 megahertz the actuator moves at a rate of 1 meter per second. To locate a specific point (position) the computer memory is consulted and the required numbers of pulses are issued. Calibration of the distance moved per pulse is accomplished by adjusting the variable resistor 40 which controls the degree of reflectance. Details of the necessary program are not included here. They are known in the art, see, for example, Optical Recording by Marchant published by Addison-Wesley Publishing Company which is incorporated from by reference.

The necessary information is displayed on the screen and the necessary inputting is, of course, carried out by the keys.

The present invention provides a read/write equipment that is small in size yet efficient in operation.

Although the forgoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

I claim:

1. An actuator able to move along a track and comprising:
    an elastic coupling member to surround the track, said coupling member having a regularly grooved internal surface;
    a plurality of pairs of piezo electric transducers surrounding said coupling member, said transducers being polarized with each member of a pair being polarized in a direction different from the other member of the pair;
    an insulator between neighbouring pairs of transducers;
    absorber means at each end of the actuator;
    means to apply voltage to said transducers whereby the application of voltage expands and contracts said transducers, which transmit pressure to said coupling member to cause it to move along said track.

2. An actuator as claimed in claim 1 in which the track is covered with synthetic rubber.

3. An actuator as claimed in claim 2 in which the synthetic rubber is chloroprene.

4. An actuator as claimed in claim 3 in which the chloroprene has a hardness of about 99 J.S.I.

5. An actuator as claimed in claim 1 in which each piezo electric transducer is a ceramic annulus having an inner and outer diameter.

6. An actuator as claimed in claim 5 including silver plating on each inner and outer diameter.

7. An actuator as claimed in claim 1 including means to maintain the structure of the actuator.

8. An actuator as claimed in claim 7 in which the means to maintain the structure comprises an outer casing;
    compression springs at each end of the casing tending to compress the transducers; and
    stops to fix the position of the springs within the case.

9. An actuator as claimed in claim 1 in which the absorber means comprises annuli mounted on the end of each actuator able to absorb waves generated in the elastic coupling member.

10. An actuator as claimed in claim 9 in which the disks are ceramic piezo electric members, radially polarized and including means to dissipate current generated in the members.

11. An actuator as claimed in claim 10 in which the means to dissipate the energy comprises a resistance joined across said piezo electric members.

12. An actuator as claimed in claim 11 further including annuli of energy absorbing material on the outside of the absorber means to provide additional absorption of wave energy.

13. An actuator as claimed in claim 12 in which the energy absorbent material comprises babbitt metal containing tungsten particles.

14. A actuator as claimed in claim 1 including control means to apply voltage pulses to said transducers, each voltage pulse acting to move said actuator along said track a pre-determined distance.

15. An actuator as claimed in claim 14 in which the piezo electric transducers include means to dissipate current generated in the transducers by application of a voltage comprising a variable resistance joined across said piezo electric transducers, adjustment of said resistor permitting adjustment of the distance moved by the actuator for each application of a voltage pulse.

16. A scanner able to scan an optic card and comprising:
    a table to receive the card;
    a reading head to view the card;
    means to move the card relative to the reading head including an actuator as claimed in claim 1.

17. A scanner as claimed in claim 16 including means to move the head laterally and longitudinally relative to the card.

18. A card scanner comprising:
a base member;
longitudinal track members mounted on said base member;
means to hold the card on said base member;
an actuator mounted on said track member and able to move along the track member, said actuator comprising:
an elastic coupling member to surround the track, said coupling member having a regularly grooved internal surface;
a plurality of pairs of piezo electric transducers surrounding said coupling member, said transducers being polarized with each member of a pair being polarized in a direction different from the other member of the pair;
an insulator between neighbouring pairs of transducers;
absorber means at each end of the actuator;
means to apply voltage to said transducers whereby the application of voltage expands and contracts said transducers, which transmit pressure to said coupling member to cause it to move along said track;
a scanning head moved by operation of said actuators to scan a card.

19. A card scanner as claimed in claim 18 including an area on said base member to receive the card during scanning, said area being defined by low friction guides.

20. A card scanner as claimed in claim 18 in which the means to hold the card on said base member comprises a cross-member extending between said actuators;
clamps on said cross-member to engage said card.

21. A card scanner as claimed in claim 20 in which the clamps are solenoids.

22. A card scanner as claimed in claim 20 in which the cross-members are hinged to the actuators.

23. A card scanner as claimed in claim 19 including springs to hold the card down on the scanning area.

24. A card scanner as claimed in claim 23 including an air lift to fly the scanning head.

25. A card scanner as claimed in claim 24 including an non-contact air supply to the air lift:
a pump to pump air to the lift; and
a valve to control the flow between the pump and the air lift.

26. A card scanner as claimed in claim 25 including a bladder in the system to regulate the pressure.

27. A card scanner as claimed in claim 25 in which the scanning head is pivotable mounted.

28. A card scanner as claimed in claim 25 including upper limits stops to restrict upward movement of the air lift.

29. A card scanner as claimed in claim 24 in which the scanning head is mounted on a cross-shaft extending between the actuators mounted on the track members.

30. A card scanner as claimed in claim 29 in which the cross-shaft is mounted to the actuators by hinged joints.

31. A card scanner as claimed in claim 28 in which power for the head comes through the pivotable mounts and through arms extending outwardly to the air lift from the pivotable mounts.

32. A card scanner as claimed in claim 18 in which the longitudinal track members include means to vary the diameter.

33. A card scanner as claimed in claim 32 in which the means to vary the diameter of the track member comprises a resistance wire extending along the interior of the track member that can be heated to vary the dimensions of the track member.

34. A card scanner as claimed in claim 18 having a three-phase power supply whose phase relationship may be varied to control the speed and direction of the actuators.

35. A card scanner as claimed in claim 18 in which the absorber means include means to vary the absorption capability of the absorber means whereby the speed of the actuator on the track may be varied.

* * * * *